United States Patent [19]
Tobol et al.

[11] 3,818,098
[45] June 18, 1974

[54] METHOD FOR CONTROLLING RICE BLAST WITH N-(3-CHLORO-P-TOLYL) MALEIMIDES

[75] Inventors: Helen K. Tobol, Concord; Ronald J. Sbragia, Clayton, both of Calif.

[73] Assignee: The Dow Chemical Company, Midland, Mich.

[22] Filed: Nov. 17, 1972

[21] Appl. No.: 307,606

[52] U.S. Cl. .............................................. 424/274
[51] Int. Cl. ........................................... A01m 9/22
[58] Field of Search ................................... 424/274

[56] References Cited
UNITED STATES PATENTS
2,205,558  6/1940  Flett .................................. 424/274

FOREIGN PATENTS OR APPLICATIONS
852,634  10/1960  Great Britain ...................... 424/274
880,555  12/1958  Great Britain ...................... 424/274

OTHER PUBLICATIONS

Torgeson et al. Contributions Boyce Thompson Institute, 1963, Vol. 22, pp. 67–70, QK 1, B 68.

*Primary Examiner*—Albert T. Meyers
*Assistant Examiner*—Dale R. Ore
*Attorney, Agent, or Firm*—Gary D. Street; C. Kenneth Bjork

[57] ABSTRACT

A method for controlling rice blast on a rice plant comprising applying to the plant to be protected a rice blast controlling amount of N-(3-chloro-p-tolyl-maleimide.

1 Claim, No Drawings

3,818,098

METHOD FOR CONTROLLING RICE BLAST WITH N-(3-CHLORO-P-TOLYL) MALEIMIDES

BACKGROUND OF THE INVENTION

1. Field of the Invention

This invention relates to a method of preventing plant disease by employing an effective disease-treating amount of N-(3-chloro-p-tolyl)maleimide.

2. Description of the Prior Art

The present invention is useful in the control and prevention of agricultural plant diseases, particularly in the control of rice blast (*Piricularia oryzae*) which is the most hazardous pest in rice plant.

N-(phenyl)maleimide and derivatives thereof have previously been studied for fungicidal activities by D. C. Torgeson, et al., Contributions from Boyce Thompson Institute, Vol. 22, p. 67 (1963). N-(3-chloro-2-methyl-phenyl)maleimide, N-(5-chloro-2-methylphenyl)maleimide and the subject compound of the present invention, N-(3-chloro-4-methylphenyl)maleimide, were among those investigated by Torgeson, et al. Torgeson, et al., report that the chemicals as a group are phytotoxic to foliage, and that investigations with such chemicals concerned their soil fungicide activity.

In view of the known phytotoxicity of such chemicals by the cited investigators, it has, however, unexpectedly and surprisingly been discovered that N-(3-chloro-p-tolyl)maleimide is effective in controlling rice blast on rice plants at low dosages without phytotoxic effect on the host rice plant. The method of the present invention therefore represents a valuable addition to the art.

SUMMARY OF THE INVENTION

The present invention relates to a method of preventing plant disease by using an effective amount of N-(3-chloro-p-tolyl)maleimide compound. The method of the present invention is useful in the control and prevention of agricultural plant diseases, particularly in the control of rice blast (*Piricularia oryzae*) which is the most hazardous pest in rice plant, and comprises applying to a host rice plant to be protected a rice blast controlling amount of N-(3-chloro-p-tolyl)maleimide.

DETAILED DESCRIPTION OF THE INVENTION

According to the method of the present invention, the unmodified N-(3-chloro-p-tolyl)maleimide compound (hereinafter referred to as the "maleimide" compound) can be utilized. However, the present invention also embraces the use of such compound with inert solid or liquid agriculturally acceptable carriers. Thus, for example, the compound can be dispersed on an inert finely divided solid and employed therein as a dust. Also, the compound, or a solid composition comprising the compound, can be dispersed in water, typically with the aid of a wetting agent, and the resulting aqueous suspension employed as a spray, drench or wash. In other procedures, the compound can be employed as a constituent of organic liquid compositions, oil-in-water and water-in-oil emulsions, or water dispersions, with or without the addition of wetting, dispersing, or emulsifying agents.

The exact concentration of the maleimide compound to be employed in the treating compositions may vary considerably provided rice plants are contacted with a rice blast controlling amount of the maleimide compound which is not phytotoxic to the host plant. The concentration of the toxicant in liquid compositions generally is from about 1.0 to about 50 percent by weight, although concentrations of up to about 95 weight percent are often employed. In dusts or dry formulations, the concentration of the toxicant can be from about 1.0 to about 10 weight percent; however, concentrations up to about 95 weight percent are often conveniently employed. In compositions to be employed as concentrates, the toxicant can be present in a concentration of from about 5 to about 98 weight percent.

The compound employed in the methods of this invention can also be used in admixture with one another or applied admixed with other chemicals which are used in agronomic and horticultural management and are compatible with the compound of this invention. Such chemicals can be, but are not restricted to, the classes of chemicals commonly known as plant nutrients, fertilizers, insecticides and other fungicides, which are not phytotoxic to the host rice plant at the effective concentration employed. The most of application, depending of course, on the physical form of the composition containing the maleimide compound, may be by spraying, drenching or dusting the rice plants.

The amount of rice blast agent applied is critical with respect to the phytotoxic effect on the host plant and the degree of inhibition of rice blast spore germination obtained. Commercially, rice blast control agents must be at least 90 percent or more effective in inhibiting rice blast spore germination to be acceptable. The rice blast controlling amount of maleimide compound in the present invention is that amount which inhibits at least 90 percent germination of rice blast spores. The $LD_{90}$ (i.e., the lowest concentration of the active compound which inhibits at least 90 percent germination of rice blast spores) of the maleimide compound of the present invention has been determined to be between about 150 and about 37 parts per million by weight. No phytotoxic effects on host rice plants are observed with the maleimide compound at concentrations as high as 2,400 parts per million by weight. The maleimide compound of the present invention is preferably employed at dosage levels of from about 37 to about 60 parts per million by weight. Preferably, a dosage of 150 parts per million by weight is employed.

The following examples are intended to illustrate the rice blast controlling activity and safeness of the maleimide compound described herein and are not intended to be limitative of the invention.

Example 1

An aqueous composition containing N-(3-chloro-p-tolyl)maleimide is prepared by mixing 4 parts by weight of the compound, 0.08 part by weight of sorbitan trioleate (Span 85), and 0.02 part of sorbitan monooleate polyoxyethylene derivative (Tween 80) are dispersed in 40 milliliters of acetone to produce a concentrate composition in the form of a water-dispersible liquid containing the test compound as the sole active agent.

Example 2

A portion of each of the concentrate composition prepared in Example 2 is diluted with 20 percent isopropanol to provide liquid compositions containing from 37 to 2,400 parts per million by weight of active compound. Rice plant seedlings 10 to 15 days old (variety, *Calora*) were sprayed with the prepared compositions; after natural drying, the plants were inoculated with an inoculum of rice blast spores (*Piricularia oryzae*) in 10 percent isopropanol. The inoculated plants were maintained under conditions conducive to germination of rice blast spores and growth for a period of 10 days. After the 10 day period, the plants were macroscopically examined to determine the percent control of spore germination at the indicated dosage rates. As a result of such operations, it was found that the N-(3-chloro-p-tolyl)maleimide compound was more than 90 percent effective in inhibiting rice blast spore germination at concentrations of 2,400, 600, 150 and 37 parts per million, respectively.

Example 3

The operations and procedures of Examples 1 and 2 above were repeated employing (1) N-(3-chloro-p-tolyl)-maleimide, (2) N-(3-chloro-o-tolyl)maleimide and (3) N-(5-chloro-o-tolyl)maleimide compounds. At concentrations of 2,400 parts per million, each of the compounds (1), (2) and (3) gave 100, 100 and 99 percent control, respectively, of rice blast spore germination. Compounds (2) and (3) were, however, phytotoxic to the host rice plants at such concentrations. At concentrations of 600 parts per million by weight, test compounds (1), (2) and (3) gave 100, 83 and 0 percent control, respectively, of rice blast spore germination. Compound (2) was slightly phytotoxic to the host rice plant at such concentration. At a concentration of 150 parts per million, compound (1) was 99 percent effective in controlling rice blast spore germination while compound (2) was only 75 percent effective.

The results indicate the N-(3-chloro-p-tolyl)maleimide compound can safely be employed without phytotoxic effects on the host rice plant at concentrations as high as 2,400 parts per million by weight whereas both the N-(3-chloro-o-tolyl)maleimide and N-(5-chloro-o-tolyl)maleimide compounds are phytotoxic to the rice plants. At lower concentrations of 600 and 150 parts per million N-(3-chloro-p-tolyl)maleimide was the only compound effective in preventing at least 90 percent rice blast spore germination.

The maleimide compound of the present invention is known and is either readily available or can be prepared according to known or analogous procedures set forth in the prior art.

While this invention has been described and exemplified in terms of its preferred embodiment, those skilled in the art will appreciate that modifications can be made without departing from the spirit and scope of the invention.

We claim:

1. A method for controlling rice blast on a rice plant comprising applying to the plant to be protected a rice blast controlling amount of N-(3-chloro-p-tolyl)maleimide.

* * * * *